(12) United States Patent
Yang et al.

(10) Patent No.: US 10,715,635 B2
(45) Date of Patent: Jul. 14, 2020

(54) NODE ROUTE SELECTION METHOD AND SYSTEM

(71) Applicant: WANGSU SCIENCE & TECHNOLOGY CO., LTD., Shanghai (CN)

(72) Inventors: Yun Yang, Shanghai (CN); Guopeng Chen, Shanghai (CN); Jiemin Zheng, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 101 days.

(21) Appl. No.: 16/301,482

(22) PCT Filed: Nov. 8, 2016

(86) PCT No.: PCT/CN2016/105003
§ 371 (c)(1),
(2) Date: Nov. 14, 2018

(87) PCT Pub. No.: WO2018/068351
PCT Pub. Date: Apr. 19, 2018

(65) Prior Publication Data
US 2019/0222675 A1  Jul. 18, 2019

(30) Foreign Application Priority Data

Oct. 10, 2016  (CN) .......................... 2016 1 088405

(51) Int. Cl.
*G06F 15/173* (2006.01)
*H04L 29/08* (2006.01)
(Continued)

(52) U.S. Cl.
CPC .......... *H04L 67/327* (2013.01); *G06F 9/5038* (2013.01); *H04L 45/123* (2013.01); *H04L 45/127* (2013.01); *H04L 45/68* (2013.01)

(58) Field of Classification Search
CPC ... G06F 9/5038; H04L 45/123; H04L 45/127; H04L 45/68
(Continued)

(56) References Cited

U.S. PATENT DOCUMENTS 9,094,464 B1 *  7/2015  Scharber ............... H04L 45/026
2001/0039565 A1 *  11/2001  Gupta ................. H04L 67/2842
709/203

(Continued)

FOREIGN PATENT DOCUMENTS

CN          1589560 A       3/2005
CN         102510530 A      6/2012
(Continued)

OTHER PUBLICATIONS

The European Patent Office (EPO) The Extended European Search Report for 16918900.8 (PCT/CN2016/105003) dated Jun. 5, 2019 8 Pages.

(Continued)

*Primary Examiner* — Umar Cheema
*Assistant Examiner* — Hannah S Wang
(74) *Attorney, Agent, or Firm* — Anova Law Group, PLLC

(57) ABSTRACT

The present disclosure provides a node route selection method. The method includes: pre-assigning a group of acceleration nodes to an ingress node by a dispatch center; receiving a user access request in the ingress node; based on the user access request, selecting, by a service component in the ingress node, a desired acceleration node from the group of the acceleration nodes assigned to the ingress node; and
(Continued)

accessing an origin server through the desired acceleration node corresponding to the user access request.

8 Claims, 4 Drawing Sheets

(51) Int. Cl.
  *H04L 12/721* (2013.01)
  *G06F 9/50* (2006.01)
(58) Field of Classification Search
  USPC .......................................................... 709/238
  See application file for complete search history.

(56) References Cited

U.S. PATENT DOCUMENTS

| | | | |
|---|---|---|---|
| 2003/0002484 A1 | 1/2003 | Freedman | |
| 2009/0193147 A1* | 7/2009 | Lepeska | H04L 67/1002 709/241 |
| 2009/0300208 A1* | 12/2009 | Lepeska | H04L 67/1002 709/233 |
| 2011/0295979 A1* | 12/2011 | Alstad | H04L 67/28 709/219 |
| 2013/0229918 A1* | 9/2013 | Ludwig | H04L 47/245 370/230 |
| 2013/0346483 A1* | 12/2013 | Alstad | H04L 69/04 709/203 |
| 2014/0207818 A1* | 7/2014 | Jellick | G06F 16/23 707/771 |
| 2014/0372504 A1* | 12/2014 | Ben Dror | H04L 41/0836 709/202 |
| 2015/0026239 A1* | 1/2015 | Hofmann | H04L 29/06047 709/203 |
| 2015/0281204 A1* | 10/2015 | Ellis | H04L 45/64 726/9 |
| 2016/0269286 A1* | 9/2016 | Zhou | H04L 45/38 |
| 2016/0295457 A1* | 10/2016 | Zhou | H04L 67/2857 |
| 2017/0099341 A1* | 4/2017 | Joe | H04L 67/2823 |

FOREIGN PATENT DOCUMENTS

| | | | |
|---|---|---|---|
| CN | 103338278 A | * | 10/2013 |
| CN | 104753965 A | | 7/2015 |
| CN | 105515915 A | * | 4/2016 |
| CN | 103117907 B | * | 9/2016 |
| WO | 03045029 A1 | | 5/2003 |
| WO | 2010049876 A2 | | 5/2010 |

OTHER PUBLICATIONS

Wang Jin et al., "An optimal Cache management framework for information-centric networks with network coding", School of Communication and Information Engineering, University of Electronic Science and Technology of China, College of Computer Science and Technology, Shanghai University of Electronic Power, Department of Electrical and Computer Engineering, University of Puerto Rico at Mayaguez, School of Computer Science and Technology, Soochow University, and Department of Computer Engineering, University of California, Santa Cruz, Jul. 17, 2014.
The World Intellectual Property Organization (WIPO) International Search Report for PCT/CN2016/105003 May 5, 2017 5 Pages.

* cited by examiner

NODE ROUTE SELECTION METHOD AND SYSTEM

CROSS-REFERENCE TO RELATED APPLICATIONS

This application is a national phase entry under 35 U.S.C § 371 of International Application No. PCT/CN2016/105003 filed on Nov. 8, 2016, which claims priority of Chinese Patent Application No. 201610884051.4, filed with the State Intellectual Property Office of P. R. China on Oct. 10, 2016, the entire contents of all of which are incorporated herein by reference.

FIELD OF THE DISCLOSURE

The present disclosure generally relates to the field of network communication and, more particularly, relates to a node route selection method and system.

BACKGROUND

To speed up response time to user access requests, content distribution networks (CDN) have been adopted. In content distribution networks, edge nodes may be deployed close to various service provider networks in the service coverage area. These edge nodes may be relied on to provide data caching to achieve the effect of access speed acceleration. However, traditional content distribution networks may support limited options for route selection. When obtaining an optimal transmission route between an ingress proxy device and an origin server, the calculation for the optimal transmission route may often be based on links between various proxy devices. The calculation method may be overly simplified and may be unable to precisely obtain the optimal transmission route.

To solve the problem set forth above, a route detection method has been proposed. In the method, a central server may obtain link quality of various segments between an ingress proxy device, an egress proxy device, and an origin server to derive an optimal transmission route.

The existing route detection method may have the following weaknesses. First, because information is uploaded and processed by a central server and the calculation result is returned to the ingress proxy device for route selection, the entire feedback cycle may be substantially long. Due to the latency problem, an optimal route may no longer be optimal by the time an actual access request is made or a response to a route selection request may simply take too long. Second, when the number of ingress proxy devices and egress devices are substantially large, the potential combinations of the detection routes may be significant. When the calculation is performed by the central server, the performance bottleneck at the central server may degrade the route selection accuracy. Third, the distributed acceleration node management method may lead to a low resource utilization rate, thereby causing resource waste to a certain degree.

BRIEF SUMMARY OF THE DISCLOSURE

The disclosed node route selection method and system are intended to solve one or more above-described technical problems.

One aspect of the present disclosure provides a route selection method, comprising: pre-assigning a group of acceleration nodes to an ingress node by a dispatch center; receiving a user access request in the ingress node; based on the user access request, selecting, by a service component in the ingress node, a desired acceleration node from the group of the acceleration nodes assigned to the ingress node; and accessing an origin server through the desired acceleration node corresponding to the user access request.

Optionally, the user access request includes a request traffic type. The selecting a desired acceleration node includes selecting an acceleration node based on the request traffic type.

Optionally, the user access request includes an IP of the origin server. The selecting a desired acceleration node includes selecting an acceleration node based on the IP of the origin server in the user access request.

Optionally, the selecting a desired acceleration node includes: determining whether route quality detection information corresponding to the origin server has been stored in the ingress node; and when it is determined that the route quality detection information corresponding to the origin server has been stored in the ingress node, selecting the desired acceleration node based on the route quality detection information.

Optionally, the selecting a desired acceleration node includes: determining whether acceleration nodes have been pre-configured for the user access request.

Optionally, when it is determined that acceleration nodes have been pre-configured for the user access request, the method further includes: extracting an IP of the origin sever in the user access request; performing quality detection on the pre-configured acceleration nodes with respect to the IP of the origin server; and determining an acceleration node having a desired quality detection result as the desired acceleration node at least partially based on the quality detection results.

Optionally, when it is determined that no acceleration node has been pre-configured for the user access request, the method further includes: extracting an IP of the origin server in the user access request and determining a geographical region corresponding to the IP of the origin server; determining whether the geographical region includes any acceleration node; when it is determined that the geographical region includes acceleration nodes, performing quality detection with respect to the IP of the origin server on the acceleration nodes corresponding to the geographical region, and determining an acceleration node having a desired quality detection result as the desired acceleration node at least partially based on the quality detection results; and when it is determined that the geographical region includes no acceleration node, performing quality detection with respect to the IP of the origin server on default acceleration nodes, and determining an acceleration node having a desired quality detection result as the desired acceleration node at least partially based on the quality detection results.

Optionally, the service component in the ingress node stores a mapping relationship between desired routes and IP of the origin servers. The service component in the ingress node detects the IP of the origin server in the mapping relationship at a certain time interval and updates detection results.

Optionally, the pre-assigning a group of acceleration nodes to an ingress node by a dispatch center includes: based on the IP address of the ingress node included in an initialization request, determining a geographical region where the ingress node is located; at least based on the geographical region determined for the ingress node, assigning a group of acceleration nodes to the ingress node; and synchronizing the ingress node with information about the group of the acceleration nodes assigned to the ingress node.

Another aspect of the present disclosure provides a node route selection system, comprising: a dispatch center configured to assign a group of acceleration nodes to an ingress node; the group of the acceleration nodes configured to access an origin server; and the ingress node configured to receive a user access request, and based on the user access request, to select a desired acceleration node to access the origin server from the group of the acceleration nodes assigned to the ingress node.

The node route selection method and system according to the present disclosure may achieve the following technical effects.

First, because user requests are not required to be uploaded to a central server for processing and for further feedback to the ingress proxy device for route selection, the present disclosure may shorten the time required for the route selection process and increase the response speed. Second, because the route selection process is distributed and executed in various ingress nodes rather than centralized processing at the dispatch center, the processing speed may be faster and may not be limited by the performance bottleneck at the central server. Third, the present disclosure may avoid duplicated calculation and improve the calculation efficiency.

The brief summary of the disclosure is provided to introduce, in a simplified form, concepts that are further described below in the section of detailed description. The brief summary of the disclosure is not intended to identify key features or essential features of the claimed subject matter, nor is it intended to limit the scope of the claimed subject matter. Further, the claimed subject matter is not limited to implementations that solve any or all of the disadvantages noted in any part of the present disclosure.

DETAILED DESCRIPTION

Reference will now be made in detail to exemplary embodiments of the disclosure, which are illustrated in the accompanying drawings. Those skilled in the art may readily understand other advantages and effects of the present disclosure as described in the specification. The present disclosure may be embodied or practiced in the ways different from the disclosed embodiments. The details described in the specification may be modified or varied for different perspectives and applications without departing from the spirit of the present disclosure.

It should be noted that, the illustrations provided in the disclosed embodiments are intended to provide only the basic concept of the present disclosure. Only the components related to the present disclosure are shown in the schematic drawings rather than the actual number, shape or size of the components in the real life applications. The actual implementation of the various components may be arbitrarily changed in type, quantity and proportion, and the component layout may also be more sophisticated.

Figure 1:
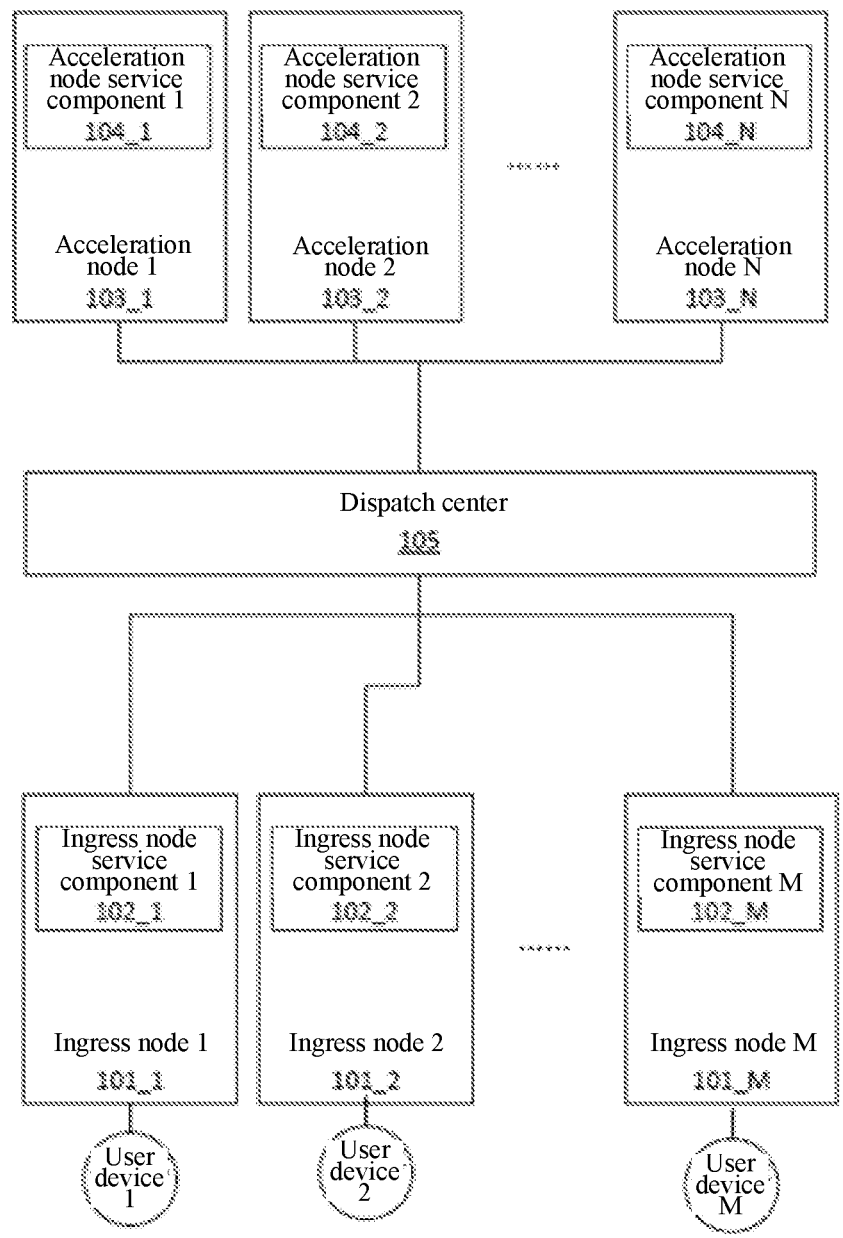
FIG. 1 illustrates a schematic diagram of an exemplary route selection system according to disclosed embodiments.

As shown in FIG. 1, FIG. 1 illustrates a schematic diagram of an exemplary route selection system according to disclosed embodiments, the route selection system 100 may include one or more ingress nodes 101_1, 101_2, . . . , 101_M. The ingress nodes 101_1 through 101_M may be located in one or more geographical regions. A user may connect to one or more ingress nodes through one or more user devices. It should be noted that, although one user device is shown for each ingress node, there may be no one-to-one relationship between any ingress node and any user device. User devices may be in various forms including, but not limited to, portable computing devices, personal digital assistants (PDA), portable media players, wearable computers, navigation devices (e.g., GPS), notebook computers, desktop computers, multimedia control platforms, and gaming systems, etc. An ingress node may receive a user access request from a user device. In one embodiment, each of the ingress nodes 101_1 through 101_M may include one of ingress node service components 102_1 through 102_M. In another embodiment, some ingress nodes may include multiple ingress node service components. The service component in the ingress node may be a specialized version. The specialized version may support various types of traffic flows. In some embodiments, the service component in the ingress node may be configured to receive a user access request, and based on the user access request, the service component in the ingress node may select a desired acceleration node from a group of acceleration nodes pre-assigned for the ingress node to access an origin server. The procedure for the ingress node service component to select a desired acceleration node may be illustrated in more details in FIG. 3 and FIG. 4.

The route selection system 100 may further include one or more acceleration nodes or groups of acceleration nodes 103_1 through 103_N. The acceleration nodes may be located in one or more geographical regions. The acceleration nodes may be configured to facilitate accessing origin servers. In some embodiments, each of the one or more acceleration nodes or groups of acceleration nodes 103_1 through 103_N may include one or more acceleration service components 104_1 through 104_N.

The route selection system 100 may further include a dispatch center 105. The dispatch center 105 may be configured to pre-assign a group of acceleration nodes to an ingress node when the ingress node goes online for the first time and subsequently to update the group of acceleration nodes assigned to the ingress node.

Figure 2:
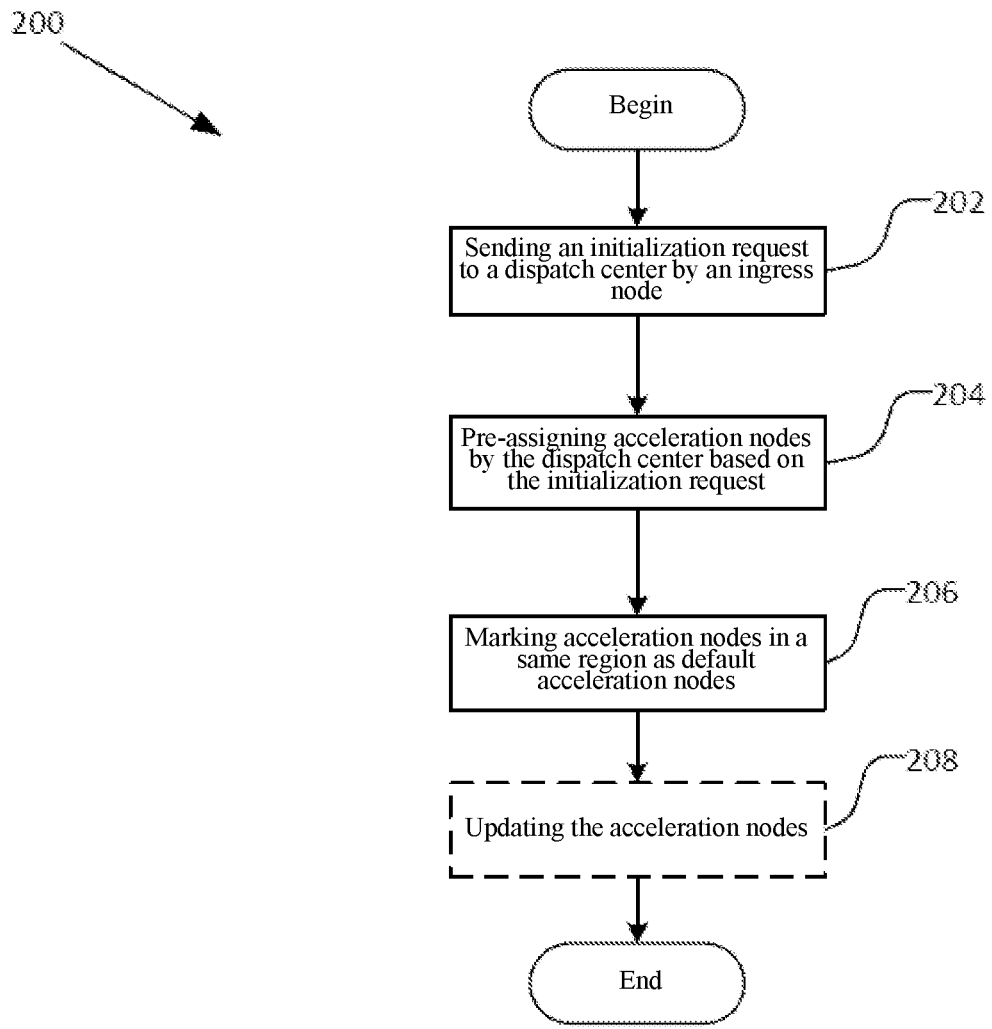
FIG. 2 illustrates a flow chart of an exemplary ingress node initialization method according to disclosed embodiments.

As shown in FIG. 2, FIG. 2 illustrates a flow chart of an exemplary ingress node initialization method according to disclosed embodiments, when an ingress node goes online for the first time, the ingress node initialization method 200 may be executed to initialize the ingress node. The ingress node initialization method 200 may include sending an initialization request by an ingress node to a dispatch center (step 202). For example, the initialization request may be sent by the ingress node service component 101_2 of the ingress node 101_1. The initialization request may include ingress node IP (Internet protocol address) information, deployed service component information, and special requirements for acceleration nodes, etc.

The method 200 may further include, based on the initialization request received from the ingress node, pre-assigning a group of acceleration nodes to the ingress node by the dispatch center 105 (step 204). Specifically, the step 204 may include determining a geographical region where the ingress node is located based on the ingress node IP information contained in the initialization request; pre-assigning a group of acceleration nodes to the ingress node based on the geographical location determined for the ingress node, the deployed service component information of the ingress node, and the ingress node's special requirements for acceleration nodes, etc.; and synchronizing the ingress node with the information about the group of the acceleration nodes assigned for the ingress node. In one embodiment, pre-assigning the group of the acceleration nodes for the ingress node may be at least partially based on a specific algorithm. In one embodiment, the specific algorithm may be a consistent hashing algorithm. In another embodiment, synchronizing the ingress node with the information about the group of the acceleration nodes assigned for the ingress node may include synchronizing the ingress node with the IP database of the group of the acceleration nodes assigned for the ingress node.

The method may further include marking by the ingress node one or more of acceleration nodes, located in a same region as the ingress node, from the group of the acceleration nodes assigned for the ingress node as default acceleration nodes (step 206). In one embodiment, the region of an ingress node and the region of an acceleration node may be determined based on the IP address of the ingress node and the IP address of the acceleration node, respectively.

The method 200 may further include updating the group of the acceleration nodes and the default acceleration nodes pre-assigned for the ingress node (step 208). In one embodiment, the ingress node may periodically send requests to the dispatch center for synchronizing the information about the group of the acceleration nodes. When the acceleration nodes are updated (e.g., new acceleration nodes are added, and existing acceleration nodes go offline, etc.), the dispatch center may re-assign acceleration nodes to the ingress node, for example, through a specific algorithm, and may synchronize the information about the newly assigned acceleration nodes with the ingress node. In one embodiment, the specific algorithm may be a consistent hashing algorithm. In another embodiment, the ingress node may periodically determine default acceleration nodes again.

Figure 3:
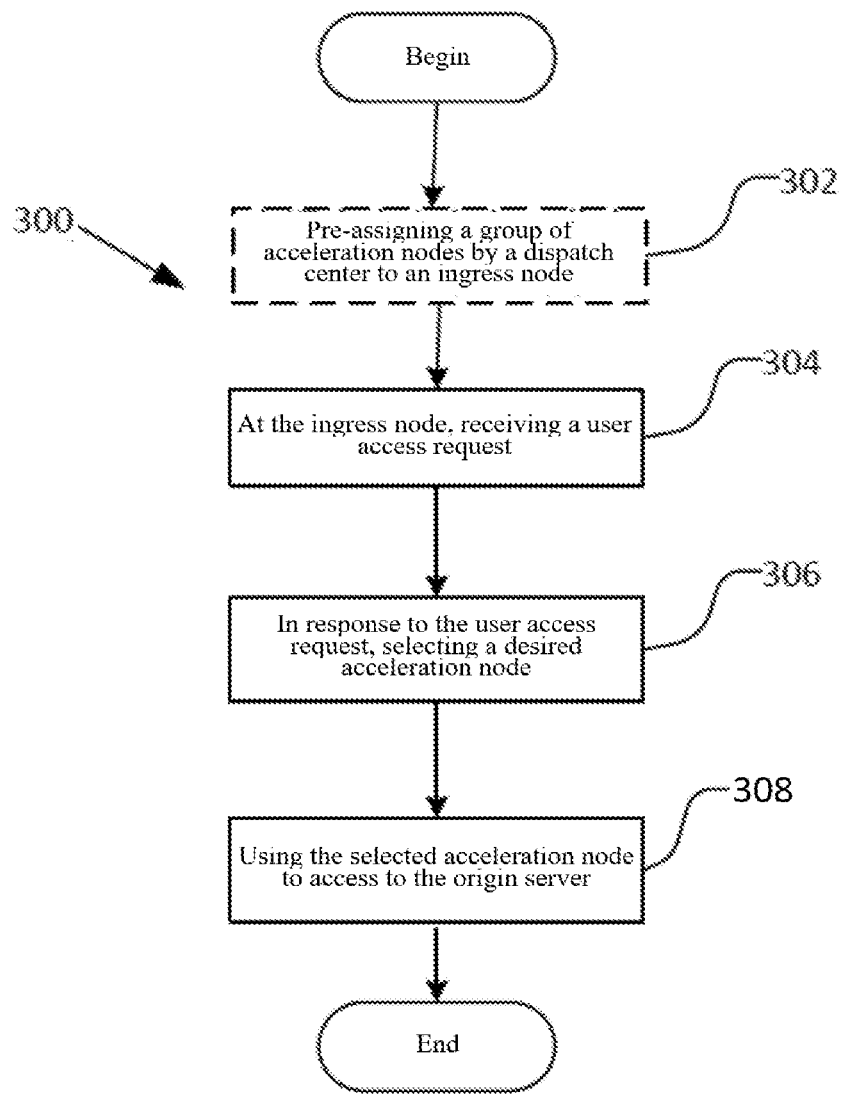
FIG. 3 illustrates a flow chart of an exemplary route selection method according to disclosed embodiments.

As shown in FIG. 3, FIG. 3 illustrates a flow chart of an exemplary route selection method according to disclosed embodiments, the method 300 may include, during the process of initializing an ingress node, based on the region where the ingress node is located, pre-assigning, by a dispatch center, a group of acceleration nodes to the ingress node (step 302). In one embodiment, the step 302 may be performed based on the ingress node initialization method described in the reference method 200. When the ingress node has already been initialized, this step may be omitted.

The method 300 may further include, at the ingress node (e.g., ingress node 101_1), receiving a user access request (step 304). In one embodiment, the user access request may include a traffic type. For illustrative purposes, the traffic type may include, but not limited to, HTTP traffic, TCP traffic, and UDP traffic, etc.

The method 300 may further include, at the ingress node, in response to the user access request, selecting a desired acceleration node from the group of the acceleration nodes assigned for the ingress node (step 306). For example, the step may be executed by an ingress service component of the ingress node. In one embodiment, selecting the desired acceleration node may be based on information about the acceleration nodes. For example, the information may include a region where the acceleration node is located, cost associated with the acceleration node, a bandwidth of the acceleration node, and communication protocols supported by the acceleration node. In one embodiment, at the ingress node service component, an acceleration node type may be pre-configured corresponding to each traffic type. For example, an acceleration node having a maximum bandwidth may be pre-configured for HTTP traffic. An acceleration node supporting TCP protocol and having a lowest cost may be pre-configured for TCP traffic. The process of selecting a desired acceleration node may be described in more details in FIG. 4.

The method 300 may further include accessing the origin server through one or more selected acceleration nodes (e.g., desired acceleration nodes) (step 308). In one embodiment, the node that has the optimal detection quality among one or more desired acceleration nodes may be selected to access the origin server. In another embodiment, any node among one or more desired acceleration nodes may be selected to access the origin server. For example, a random node among one or more desired acceleration nodes may be selected to access the origin server.

Figure 4:
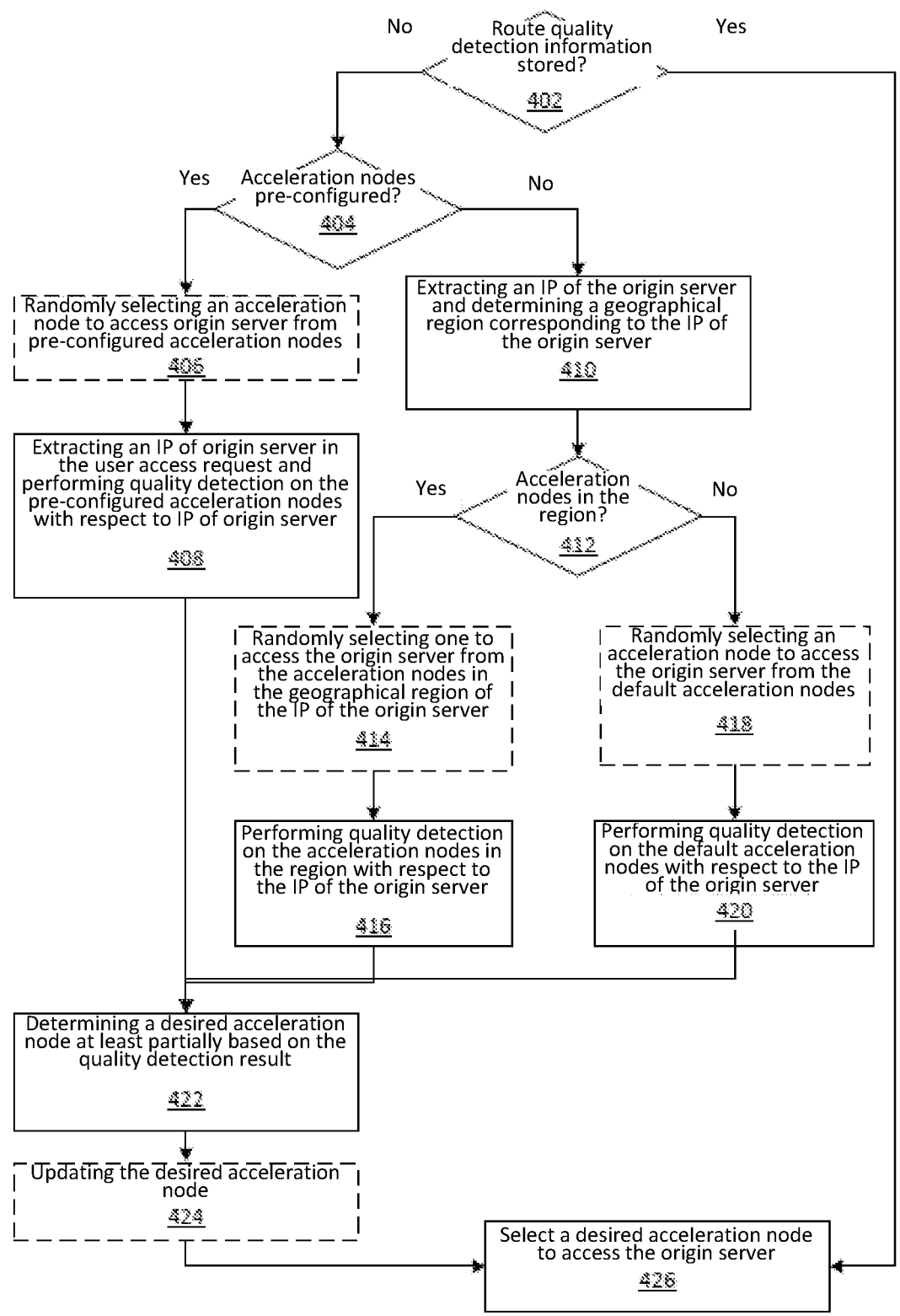
FIG. 4 illustrates a flow chart of selecting a desired acceleration node according to disclosed embodiments.

As shown in FIG. 4, in one embodiment, the process of selecting a desired acceleration node in response to a user access request may include determining whether detection quality information has been stored for the origin server in the user access request (step 402). Specifically, whether a detection quality result has been stored for the origin server in the user access request may be determined, and then a desired acceleration node may be determined. When it is determined in the step 402 that the detection quality information has been stored for the origin server in the user access request, the process may proceed to the step 426: selecting a desired acceleration node based on the detection quality information to access the origin server. When it is determined in the step 402 that no detection quality information has been stored for the origin server in the user access request (e.g., initial user access request to the origin server), the process may proceed to the step 404: determining whether to pre-configure one or more acceleration nodes for the user access request. When it is determined in the step 404 that acceleration nodes have been pre-configured for the user access request, the process may proceed to the step 408: extracting an IP address of the origin server in the user access request by the ingress node service component and performing quality detection on one or more pre-configured acceleration nodes corresponding to the IP address of the origin server. For example, the IP address of the origin server may be accessed through one or more pre-configured acceleration nodes, and the access parameters (e.g., response delay, stability, etc.) may be evaluated to obtain the quality detection results. In one embodiment, the quality detection results corresponding to one or more acceleration nodes may be stored, for example, in the ingress node. In the subsequent step 422, one or more desired acceleration nodes may be determined at least partially based on the quality detection results. For example, one or more acceleration nodes having a lowest response delay may be determined to be desired acceleration nodes. In addition, other factors including one or more of cost of acceleration node, bandwidth of acceleration node, and protocol type supported by acceleration node, etc. may be considered to determine desired acceleration nodes. In one embodiment, desired acceleration nodes may be updated in the subsequent step 424. For example, desired acceleration nodes may be updated periodically (e.g., every minute, every hour, every day, and every week, etc.) The process of determining desired acceleration nodes may be repeated for updating desired acceleration nodes. In the subsequent step 426, the desired acceleration nodes may be selected as the acceleration nodes selected in the step 304.

In another embodiment, the process may further include randomly selecting one of the pre-assigned acceleration nodes to access the origin server (step 406). As shown in FIG. 4, although the step 406 precedes the step 408, the step 406 may be executed at other moments.

When it is determined in the step 404 that no acceleration node has been pre-configured for the request, the process may proceed to the step 410: extracting an IP of the origin server in the user access request and determining a geographical region corresponding to the IP of the origin server. In one embodiment, determining a geographical region corresponding to the IP of the origin server may include comparing the IP of the origin server with data in an IP database to determine the geographical region. In the subsequent step 412, whether the geographical region includes any acceleration node may be determined. When it is determined in the step 412 that the region includes acceleration nodes, the process may proceed to the step 416: performing quality detection on the acceleration nodes in the region with respect to the IP of the origin server. Similarly, the IP of the origin server may be accessed through one or more acceleration nodes corresponding to the region. The accessing parameters (e.g., response delay, stability, etc.) may be evaluated to obtain the quality detection results. Then, the process may proceed to the step 422: selecting an acceleration node at least partially based on the quality detection results as the desired acceleration node. Subsequently, the desired acceleration nodes may be updated (step 424). In the subsequent step 426, the desired acceleration nodes may be selected as the acceleration nodes selected in the step 304.

In some embodiments, the process may further include the step 414: randomly selecting an acceleration node to access the origin server from the acceleration nodes in the geographical region corresponding to the IP of the origin server. Similarly, as shown in FIG. 4, although the step 414 precedes the step 416, the step 414 may be executed at other moments.

When it is determined in the step 412 that the geographical region includes no acceleration node, the process may proceed to the step 420: performing quality detection on the default acceleration nodes with respect to the IP of the origin server. For example, the default acceleration nodes may be pre-configured. Then, the process may proceed to the steps 422, 424 and 426.

Similarly, the process may include the step 418: randomly selecting one of the default acceleration nodes to access the origin server. As shown in FIG. 4, although the step 418 precedes the step 420, the step 418 may be executed at other moments.

In addition, in the operation process, the ingress node service component may periodically perform quality detection, update the quality detection results, and select new desired acceleration nodes to replace existing desired acceleration nodes based on the updated detection quality results.

Any communication between the ingress node and the acceleration nodes may be encrypted.

For illustrative purposes, more specific examples are provided below. It should be understood that the examples are intended to be illustrative and not to limit the scope of the present disclosure.

It is assumed that a region A has ingress nodes X/Y and a region B has an ingress node Z for serving users in the region A and the region B. In some embodiments, user access requests that a user sends to an ingress node may have no special requirements. It is assumed that in the resource pool of a dispatch center, acceleration nodes 1 through 12 are located in the region A, acceleration nodes 13 through 24 are located in the region B, and acceleration nodes 25 through 36 are located in a region C. The acceleration nodes 1 through 36 may support service types of the ingress nodes X/Y/Z. It is also assumed that the acceleration nodes 1 through 36 may have equal weights in bandwidth and cost.

The ingress node initialization process may include the following.

1. Service components deployed in the ingress nodes X/Y/Z may go online for the first time. The ingress nodes X/Y/Z may request acceleration nodes from a dispatch center and may report IP information of the ingress nodes X/Y/Z and version information of the service components to the dispatch center.

2. The dispatch center may receive the requests. The IP information of the ingress nodes X/Y/Z may be looked up in an IP database. The ingress nodes X/Y may be determined to be located in the region A. The ingress node Z may be determined to be located in the region B. Based on the version information of the service components deployed in the ingress nodes X/Y/Z, all acceleration nodes that support the service types of the ingress nodes X/Y/Z may be determined and selected.

3. The dispatch center may use a consistent hashing algorithm to select a certain number of acceleration nodes in each region from the acceleration nodes supporting the service types of the ingress nodes X/Y/Z to return to the ingress nodes X/Y/Z.

4. The dispatch center may assign acceleration nodes 1 through 8, 13 through 20, and 25 through 32 to the ingress node X, assign acceleration nodes 5 through 12, 17 through 24, and 29 through 36 to the ingress node Y, and assign acceleration nodes 1 through 4, 9 through 12, 13 through 16, 21 through 23, 25 through 28, and 33 through 36 to the ingress node Z. At the same time, the dispatch center may synchronize the IP database with ingress nodes X/Y/Z. The ingress nodes X/Y/Z may obtain acceleration nodes that are different or duplicated. However, the total number of the acceleration nodes may be evenly distributed to all ingress nodes.

5. The ingress nodes X/Y/Z may look up the IP database to find regions corresponding to the IP information of the ingress nodes, respectively, and may mark the acceleration nodes in the respective region as default acceleration nodes for the corresponding region. The ingress node X may mark the acceleration nodes 1 through 8 in the region A as the default acceleration nodes for the region A. The ingress node Y may mark the acceleration nodes 5 through 12 in the region A as the default acceleration nodes for the region A. The ingress node Z may mark the acceleration nodes 13 through 16, and 21 through 23 in the region B as the default acceleration nodes for the region B.

6. In the service process, the ingress nodes X/Y/Z may send update requests to the dispatch center periodically at a certain time interval. When the acceleration nodes (added or deleted) vary, the dispatch center may adjust the assignment and synchronize the ingress nodes with the adjusted assignment, and the ingress nodes may update the acceleration nodes with the received information. When the acceleration nodes do not vary, the dispatch center may return no change, and the ingress nodes may not update the acceleration nodes.

When the users in the region A or in the region B send access requests to the ingress nodes, the route selection process may include the following.

1. A user request may be directed to arrive at the ingress nodes X/Y in the region A and the ingress node Z in the region B through a certain manner. When the ingress nodes X/Y/Z do not have any access record for the request, the Internet user in the region A and the region B may be determined to go online for the first time.

2. The service components deployed in the ingress nodes X/Y/Z may analyze the IP of the origin server carried in the request and look up the IP database for a region corresponding to the IP of the origin server. In this case, it is assumed that the IP of the origin server is located in the region A.

3. The service component in the ingress node X may randomly select one of the acceleration nodes 1 through 8 in the region A to access the origin server, and may include the origin server in the quality detection for the acceleration nodes 1 through 8 in the region A.

4. The service component in the ingress node Y may randomly select one of the acceleration nodes 5 through 12 in the region A to access the origin server, and may include the origin server in the quality detection for the acceleration nodes 5 through 12 in the region A.

5. The service component in the ingress node Z may randomly select one of the acceleration nodes 1 through 4 and 9 through 12 in the region A to access the origin server, and may include the origin server in the quality detection for the acceleration nodes 1 through 4 and 9 through 12 in the region A.

6. The service components in the ingress nodes X/Y/Z may separately analyze the detection results, and may obtain desired acceleration nodes having desired access quality corresponding to the origin server, respectively (assuming the acceleration node 1, the acceleration node 12, and acceleration node 10, respectively).

7. The communication between the ingress nodes and the acceleration nodes may be encrypted.

8. A second user request may arrive at the ingress nodes X/Y/Z. The ingress nodes X/Y/Z may look up the detection information of the domain name. The user request may access the origin server through the acceleration node 1, the acceleration node 12, and the acceleration node 10, respectively.

9. More requests may arrive at the ingress nodes X/Y/Z constantly. The service components may detect service quality of the origin server through the acceleration nodes in the region A at a certain time interval and may update the detection results to obtain the updated acceleration nodes having desired access quality. Thus, user requests may access the origin server in a timely manner through the acceleration nodes having desired access quality.

It can be seen that the disclosed route selection process may be executed in the ingress nodes rather than being centralized for execution in the dispatch center. Compared to the traditional method, because user requests are not uploaded to the dispatch center for processing and then returned to ingress proxy devices for route selection, the present disclosure may shorten the time required in the route selection process and improve the response speed. Further, because the route selection process is distributed and processed in various ingress nodes rather than being centralized for processing in the dispatch center, the processing speed in disclosed embodiments may be faster and may not be constrained by the performance bottleneck of the dispatch center. Further, the present disclosure may avoid duplicated calculation and improve the calculation efficiency.

It should be understood that the system and/or method described herein are essentially illustrative and are not intended to limit the scope of the present disclosure due to numerous potential variations. The exemplary processes or methods disclosed in various embodiments may be one or more of numerous process solutions. Thus, the various steps shown and/or described may be executed in the sequences shown and/or described, in other sequences, or in parallel, or may be omitted. Similarly, the sequences of the steps in various disclosed processes may be altered.

The subject matter of the present disclosure may include all novel and non-obvious combinations and sub-combinations of various processes, systems, and configurations, and other features, functions, acts and/or properties disclosed herein, and any and all equivalents thereof.

What is claimed is:

1. A node route selection method, comprising:
  pre-assigning a group of acceleration nodes to an ingress node by a dispatch center;
  receiving a user access request from a user device by the ingress node;
  based on the user access request, selecting, by a service component in the ingress node, a desired acceleration node from the group of the acceleration nodes assigned to the ingress node; and
  accessing an origin server in the user access request through the desired acceleration node corresponding to the user access request,
  wherein the selecting the desired acceleration node includes:
    determining whether route quality detection information corresponding to the origin server has been stored in the ingress node;
    when it is determined that the route quality detection information corresponding to the origin server has been stored in the ingress node, selecting the desired acceleration node based on the route quality detection information;
    when it is determined that no route quality detection information corresponding to the origin server has been stored in the ingress node, determining whether acceleration nodes have been pre-configured for the user access request; and
    when it is determined that no acceleration node has been pre-configured for the user access request, the method further including:
      extracting an IP of the origin server in the user access request and determining a geographical region corresponding to the IP of the origin server;
      determining whether the geographical region includes any acceleration node; and
      when it is determined that the geographical region includes acceleration nodes, selecting one of the acceleration nodes as the desired acceleration node.

2. The method of claim 1, wherein:
  the user access request includes a request traffic type; and
  the selecting a desired acceleration node includes selecting an acceleration node based on the request traffic type.

3. The method of claim 1, wherein:
  the user access request includes an IP of the origin server; and
  the selecting a desired acceleration node includes selecting an acceleration node based on the IP of the origin server in the user access request.

4. The method of claim 1, when it is determined that acceleration nodes have been pre-configured for the user access request, further including:

extracting an IP of the origin sever in the user access request;

performing quality detection on the pre-configured acceleration nodes with respect to the IP of the origin server; and determining an acceleration node having a desired quality detection result as the desired acceleration node at least partially based on the quality detection results.

5. The method of claim 1, when it is determined that no acceleration node has been pre-configured for the user access request, further including:

when it is determined that the geographical region includes acceleration nodes, performing quality detection with respect to the IP of the origin server on the acceleration nodes corresponding to the geographical region, and determining an acceleration node having a desired quality detection result as the desired acceleration node at least partially based on the quality detection results; and when it is determined that the geographical region includes no acceleration node, performing quality detection with respect to the IP of the origin server on default acceleration nodes, and determining an acceleration node having a desired quality detection result as the desired acceleration node at least partially based on the quality detection results.

6. The method of claim 1, wherein:

the service component in the ingress node stores a mapping relationship between desired routes and IP of the origin servers; and the service component in the ingress node detects the IP of the origin server in the mapping relationship at a certain time interval and updates detection results.

7. The method of claim 1, wherein the pre-assigning a group of acceleration nodes to an ingress node by a dispatch center includes:

based on the IP address of the ingress node included in an initialization request, determining a geographical region where the ingress node is located;

at least based on the geographical region determined for the ingress node, assigning a group of acceleration nodes to the ingress node; and synchronizing the ingress node with information about the group of the acceleration nodes assigned to the ingress node.

8. A node route selection system, comprising:

a memory; and a processor, coupled to the memory to perform:

pre-assigning a group of acceleration nodes to an ingress node by a dispatch center;

receiving a user access request from a user device by the ingress node;

based on the user access request, selecting, by a service component in the ingress node, a desired acceleration node from the group of the acceleration nodes assigned to the ingress node; and accessing an origin server in the user access request through the desired acceleration node corresponding to the user access request, wherein the selecting the desired acceleration node includes:

determining whether route quality detection information corresponding to the origin server has been stored in the ingress node;

when it is determined that the route quality detection information corresponding to the origin server has been stored in the ingress node, selecting the desired acceleration node based on the route quality detection information;

when it is determined that no route quality detection information corresponding to the origin server has been stored in the ingress node, determining whether acceleration nodes have been pre-configured for the user access request; and when it is determined that no acceleration node has been pre-configured for the user access request, further including:

extracting an IP of the origin server in the user access request and determining a geographical region corresponding to the IP of the origin server;

determining whether the geographical region includes any acceleration node; and when it is determined that the geographical region includes acceleration nodes, selecting one of the acceleration nodes as the desired acceleration node.

* * * * *